March 24, 1970     J. F. O'HARA     3,502,349

VELOCIPEDE WITH CHAIN DRIVE

Filed June 6, 1968

INVENTOR

James F. O'Hara

3,502,349
VELOCIPEDE WITH CHAIN DRIVE
Janvier F. O'Hara, 757 Idle Hour Lane,
Sierra Madre, Calif. 91024
Filed June 6, 1968, Ser. No. 734,903
Int. Cl. B62k *9/00, 19/16*
U.S. Cl. 280—261                                                    2 Claims

ABSTRACT OF THE DISCLOSURE

A velocipede having a vehicle body made of a thermoplastic material and having a pedalcranked chain drive system connected to the vehicle body. The means permitting the vehicle body to thermally expand and contract independently of the driving and driven axles and of the chain tension relate to the materials and apparatus employed in the vehicle construction.

---

This invention relates to improvements in velocipedes having a pedalcrank connected to a driven wheel by means of a drive chain.

In a velocipede which is rider-propelled by a pedalcrank axle connected to a driven wheel by means of a chain, sprockets, and driven axle, it is customary to make the vehicle frame or vehicle body of metal whereby the frame and chain are of like materials and therefore matched in their thermal characteristics of expansion and contraction. Once the chain is preset to a preferred tension by a spacing of the driving and driven axles, the tension is maintained at all conditions of hot and cold weather exposure of the vehicle. In other cases of prior art, a cover or covers, of sheet metal or plastic, are attached to the frame to provide the simulative capability of a farm tractor, horse, or other animal or object as preferred. When a thermoplastic animal figure is employed, its attachment to the frame may include slots in the animal figure whereby its greater thermal change of dimensions over the metal frame, as much as 10:1, may take place without obstruction from its attachments and the metal frame.

It is the object of this invention to define means whereby the vehicle body, whether simulating an animal, farm tractor or other object, may be made as a hollow shell and of a thermoplastic material, as for example, of polyethylene; the shell is additionally intended to function as supporting means for the pedalcrank axle, roller chain, and driven axle and its wheels, the construction being made whereby the thermoplastic shell is capable of thermal expansion and contraction without affecting the tension of the steel roller chain.

This and other more specific objectives will appear upon reading the following specification and claims and upon considering in connection therewith the attached drawings to which they relate.

Referring to the drawings.

Figure 1:
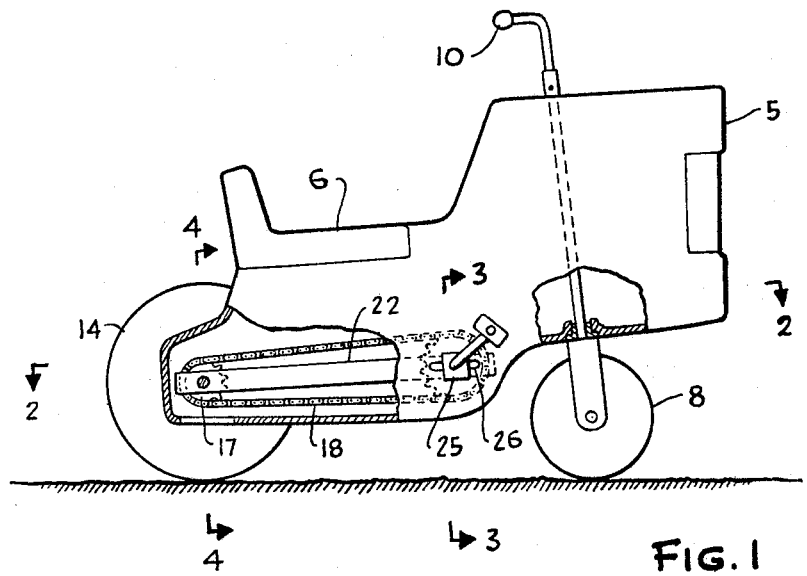
FIG. 1 is a cutaway view in elevation of a vehicle of the invention.
Figure 2:
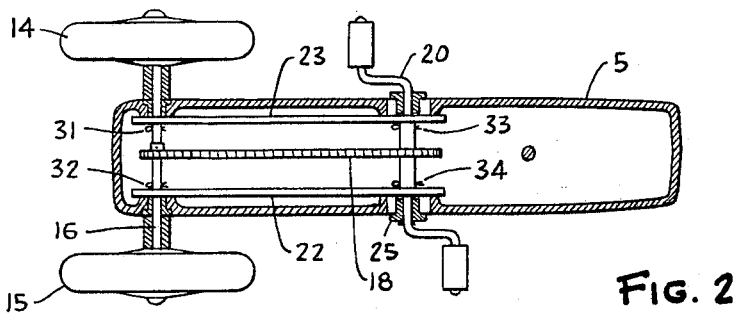
FIG. 2 is a section view of FIG. 1.
Figures 3, 4:
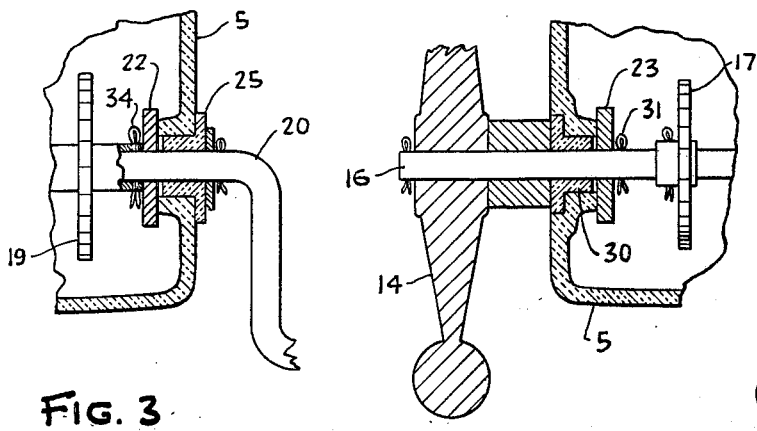
FIG. 3 is a section view of FIG. 1.
FIG. 4 is a section view of FIG. 1.

In the figures of the drawings, the velocipede is shown as comprising a vehicle body 5 made as a hollow shell and of a thermoplastic material; the vehicle body is shown in simulation of a farm tractor and includes a rider's seat 6 for occupancy of the rider who propels the vehicle.

A steerable front running wheel 8 is journalled to the vehicle body and connected to a handlebar 10. Rear running wheels 14, 15 are connected to the axle 16, which is journalled to the vehicle body. A sprocket 17, roller chain 18 of metal and preferably of steel, sprocket 19, and pedalcrank axle 20. A pair of spacer-bars 22, 23 of metal and preferably of the same metal as the chain, interconnect the axles and maintains the axles in a spaced relationship while at the same time permitting the axles to rotate in the spacer-bars. Conveniently, the spacer bars may be made from steel bar stock with holes in their ends to accommodate the axles, as shown. The pedalcrank axle is journalled in a bearing 25 which rides back and forth in the slot 26 of the vehicle body, the construction being duplicated at both sides of the vehicle body. Another bearing 30 is employed at the axle 16, and is also duplicated on the other side of the vehicle body; the bearings reduce wear at the vehicle body from the turning of the axles. The spacer-bars are maintained in position by their proximity to the inner surfaces of the shell walls and by the cotter pins 31, 32, 33, and 34.

The spacer-bars and chain, being of like materials, have equal thermal coefficients of expansion, and chain tension is thereby maintained at a preset condition under variable outdoor temperature exposures of the vehicle. The vehicle body, being of a thermoplastic material and having a thermal coefficient of expansion as much as ten times greater than the chain, is free to expand and contract from variable temperatures by means of the slots in the vehicle body and the fixed journalling of the axle 16; the axles 16 and 20 retain their preset spacing and original chain tension.

Public use of the vehicle may be anticipated as providing a heating and cooling of the vehicle from year-around outdoor temperatures ranging from 20 degrees F. to 120 degrees F., consideration being given to direct summer sunlight exposure heating the vehicle body to a temperature in excess of the ambient air temperature. This range of temperatures is sufficient to require means whereby the thermal independence of the unlike materials is permitted; the thermoplastic shell would otherwise deform from the higher temperature and from the restriction of the chain as applied to the axles and into the shell.

The invention discloses the spacer-bars as being simple, low-cost, and light weight structure for establishing the driving and driven axles in a preset spacing providing a taut roller chain at all conditions of vehicle operation. The journalling of the axles and attachment of the spacer-bars may be accomplished by several different methods than shown according to skill and preference.

I claim:

1. A velocipede comprising a vehicle body made of a thermoplastic material, a pedalcrank axle and running wheel axle connected to a metal axle-spacing means, suitable sprockets and a metal roller chain interconnecting the axles, means whereby the vehicle body supports the axle-spacing means, means whereby the vehicle body is adapted to thermally expand and contract independently of the spacing means and axles, and suitable running wheels including a running wheel connected to the running wheel axle.

2. A velocipede comprising a vehicle body made of a thermoplastic material, a pedalcrank axle and running wheel axle connected to a metal axle-spacing means, suitable sprockets and a metal roller chain interconnecting the axles, means journalling one of the axles to the vehicle body, means whereby the vehicle body supports the axle-spacing means, means whereby the vehicle body is adapted to thermally expand and contract independently of the spacing means and axles, and suitable running wheels including a running wheel connected to the running wheel axle.

(References on following page)

References Cited

UNITED STATES PATENTS

| | | | |
|---|---|---|---|
| 2,570,711 | 10/1951 | Rempel. | |
| 2,755,095 | 7/1956 | Douglas et al. | 280—261 X |
| 2,797,105 | 6/1957 | Douglas et al. | 280—1.11 X |
| 3,116,073 | 12/1963 | Ott et al. | 280—261 |
| 3,233,916 | 2/1966 | Bowden | 280—281 X |

FOREIGN PATENTS 723,062  2/1955  Great Britain.

KENNETH H. BETTS, Primary Examiner

U.S. Cl. X.R.

280—282